US008565767B2

(12) United States Patent
Horn et al.

(10) Patent No.: US 8,565,767 B2
(45) Date of Patent: Oct. 22, 2013

(54) HANDOFFS IN A MESHED WIRELESS SYSTEM

(75) Inventors: Gavin Bernard Horn, La Jolla, CA (US); Donald William Gillies, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 914 days.

(21) Appl. No.: 11/454,688

(22) Filed: Jun. 16, 2006

(65) Prior Publication Data

US 2007/0002796 A1 Jan. 4, 2007

Related U.S. Application Data

(60) Provisional application No. 60/691,869, filed on Jun. 16, 2005.

(51) Int. Cl.
*H04W 36/00* (2009.01)

(52) U.S. Cl.
USPC ........... 455/436; 455/437; 455/438; 455/439; 455/440; 455/441; 455/442; 455/443; 455/444; 455/445

(58) Field of Classification Search
USPC .................................. 455/436–445
See application file for complete search history.

(56) References Cited

U.S. PATENT DOCUMENTS

| 6,192,028 B1 * | 2/2001 | Simmons et al. ............. 370/229 |
| 6,442,150 B1 * | 8/2002 | Kondo et al. ................. 370/331 |
| 7,197,019 B2 * | 3/2007 | Menzel et al. ................ 370/331 |
| 7,512,099 B2 * | 3/2009 | Ameigeiras et al. .......... 370/331 |
| 2002/0141368 A1 * | 10/2002 | Cheung et al. ................ 370/338 |
| 2002/0151275 A1 * | 10/2002 | Trost et al. ....................... 455/41 |
| 2004/0081119 A1 | 4/2004 | Zhong et al. |
| 2004/0213352 A1 * | 10/2004 | Lundby et al. ................ 375/260 |
| 2005/0101328 A1 * | 5/2005 | Son et al. ....................... 455/436 |

FOREIGN PATENT DOCUMENTS

| CN | 1118206 | | 8/2003 |
| EP | 1331791 | A2 | 7/2003 |
| EP | 1337125 | | 8/2003 |
| EP | 1345463 | A2 | 9/2003 |
| EP | 1401151 | A2 | 3/2004 |
| JP | 2002501695 | T | 1/2002 |
| JP | 2005006043 | | 1/2005 |
| WO | 9847302 | A2 | 10/1998 |

OTHER PUBLICATIONS

Isobe S. et al., "Handover With Proactive Anchor Router Relocation and Data Buffering," IEICE Transactions on Communications, Communications Society, Tokyo, Japan, vol. E87-B, No. 5, May 2004, pp. 1193-1201, XP-001217935.

(Continued)

*Primary Examiner* — Wayne Cai
*Assistant Examiner* — Matthew Genack
(74) *Attorney, Agent, or Firm* — Nicholas J. Pauley; Peter Kamamrchik; Joseph Agusta

(57) ABSTRACT

Methods of handing off an access terminal in a meshed wireless system is disclosed. Data that is received by an access point in the meshed wireless system may be routed to an access terminal via a downstream serving access point. The access point may also be configured to communicate a connection state of the access terminal to a target access point if a handoff of the access terminal from the serving access point to the target access point is requested.

70 Claims, 7 Drawing Sheets

(56) References Cited

OTHER PUBLICATIONS

Dawi, Jeong et al., "The Performance Analysis of QoS Provisioning Method With Buffering and CAC in the Multimedia Wireless Internet," VTC Fall 2001, IEEE 54th Vehicular Technology Conference, Proceedings, Atlantic City, NJ, Oct. 7-Nov. 2001, vol. 1 of 4, Conf. 54, XP010562540.

International Search Report and Written Opinion—PCT/US2006/023507, International Search Authority—European Patent Office—Jan. 3, 2007.

Taiwanese Search report—095121773—TIPO—May 25, 2010.

* cited by examiner

HANDOFFS IN A MESHED WIRELESS SYSTEM

CROSS-REFERENCE TO RELATED APPLICATIONS

This application is related to and claims the benefit of the filing date of U.S. provisional application No. 60/691,869, filed on Jun. 16, 2005, entitled "Handoff in a Meshed Wireless System."

BACKGROUND

1. Field

The present disclosure relates generally to telecommunications, and more particularly, to handoffs in a meshed wireless system.

2. Background

In conventional wireless communications, an access network is generally used to connect any number of access terminals to a wide area network (WAN), such as the Internet or a Public Switched Telephone Network (PSTN). The access network is typically implemented with multiple fixed-site access points dispersed throughout a geographic region. The geographic region is generally divided into cells. Each access point is configured to provide a point of access to a WAN for access terminals in a cell.

A meshed wireless system is formed by a number of access points that join together to connect access terminals to a WAN. Data between an access terminal and the wide area network is routed from one access point to another until the data reaches a wired access point. A wired access point connects the access points to the rest of the WAN. The access points can route the data through the meshed wireless system to accommodate varying traffic demands, handoffs, and access point failures.

As an access terminal roams through the meshed wireless system, it may require hand off from a serving access point to a target access point. As part of the handoff procedure, the connection between the access terminal and the WAN is rerouted through the meshed wireless system to the target access point. However, because of the delay through the meshed wireless system, some of the data transmitted by the WAN to the serving access point may be in transit through the meshed wireless system when the access terminal hands off to the target access point. As a result, data may be lost during handoff.

SUMMARY

An aspect of a processor is disclosed. The processor is configured to route data to an access terminal via a first access point, and communicate a connection state of the access terminal to a second access point if a handoff of the access terminal from the first access point to the second access point is requested.

Another aspect of a processor is disclosed. The processor is configured to detect data being routed from a first access point to a second access point communicatively coupled to an access terminal, store the data in a buffer, receive a handoff of the access terminal, and route to the access terminal at least a portion of the data in the buffer.

An aspect of a method of handing off an access terminal is disclosed. The method includes routing data to an access terminal via a first access point, and communicating a connection state of the access terminal to a second access point if a handoff of the access terminal from the first access point to the second access point is requested.

Another aspect of a method of handing off an access terminal is disclosed. The method includes detecting data being routed from a first access point to a second access point communicatively coupled to an access terminal, storing the data in the buffer, receiving a handoff of the access terminal, and routing to the access terminal at least a portion of the data in the buffer.

An aspect of an apparatus is disclosed. The apparatus include means for routing data to an access terminal via a first access point, and means for communicating a connection state of the access terminal to a second access point if a handoff of the access terminal from the first access point to the second access point is requested.

Another aspect of an apparatus is disclosed. The apparatus includes means for detecting data being routed from a first access point to a second access point communicatively coupled to an access terminal, means for storing the data, means for receiving a handoff of the access terminal, and means for routing to the access terminal at least a portion of the data in the buffer.

An aspect of a computer readable medium having a computer program is disclosed. The computer program includes instructions to route data to an access terminal via a first access point, and communicate a connection state of the access terminal to a second access point if a handoff of the access terminal from the first access point to the second access point is requested.

Another aspect of a computer readable medium having a computer program is disclosed. The computer program includes instructions to detect data being routed from a first access point to a second access point communicatively coupled to an access terminal, store the data in the buffer, receive a handoff of the access terminal, and route to the access terminal at least a portion of the data in the buffer.

A further aspect of an apparatus is disclosed. The apparatus includes a router configured to route data to an access terminal via a first access point, and a controller configured to communicate a connection state of the access terminal to a second access point if a handoff of the access terminal from the first access point to the second access point is requested.

A yet further aspect of an apparatus is disclosed. The apparatus includes a transceiver configured to detect data being routed from a first access point to a second access point communicatively coupled to an access terminal, a buffer configured to store the data, and a controller configured to receive a handoff of the access terminal, and route to the access terminal at least a portion of the data in the buffer.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various concepts will be described in the context of a meshed wireless system. While these concepts are well suited for this application, those skilled in the art will readily appreciate that these concepts are likewise applicable to other access networks. Accordingly, any reference to a meshed wireless system is intended only to illustrate these concepts, with the understanding the such concepts have a wide range of applications.

Figure 1:
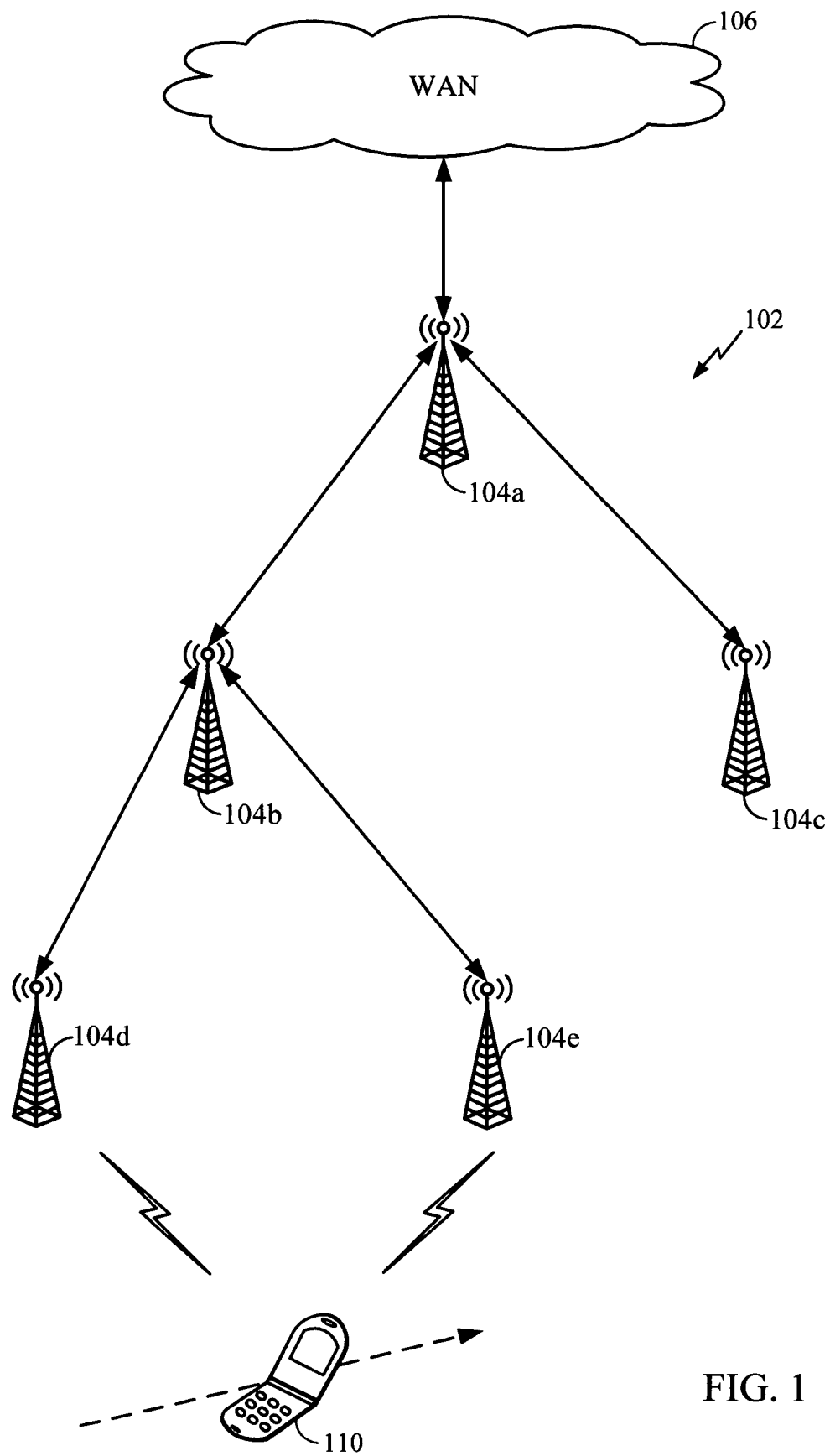
FIG. 1 is a conceptual block diagram of an embodiment of a meshed wireless system.

FIG. 1 is a conceptual block diagram illustrating an example of a cluster in a meshed wireless system. A "cluster" is a number of access points joined together to connect one or more access terminals to a WAN. The cluster 102 includes an access point 104a having a wired backhaul connection to a WAN 106, such as the Internet. The access point 104a will be referred to as a "clusterhead." The cluster 102 is also shown with four additional fixed-site access points 104b-104e dispersed through the geographic coverage region, but may include any number of access points depending on the distance the cluster 102 must cover and the nature of the terrain. In an alternative embodiment of the cluster 102, the access points may be mobile. By way of example, an access point may be integrated into each access terminal carried by a user on foot or in a vehicle, aircraft or ship.

The meshed wireless system is created by establishing radio links between the access points. In the embodiment shown in FIG. 1, the clusterhead 104a has a radio link with access points 104b, 104c, respectively. The access point 104b also has a radio link with access point 104d, 104e. The wireless technology used to support the radio links may vary depending on the specific application and the overall design constraints imposed on the overall system. By way of example, the radio links can be implemented using World Interoperability for Microwave Access (WiMAX), infrared protocols such as Infrared Data Association (IrDA), Bluetooth(r) technology, ultra wide band (UWB) protocol, home radio frequency (HomeRF), Ethernet compatibility alliance (WECA), wireless fidelity alliance (Wi-Fi Alliance), 802.11 network technology, private wireless communications network, land mobile radio network, code division multiple access (CDMA), wideband code division multiple access (WCDMA), time division multiple access (TDMA), frequency division multiple access (FDMA), orthogonal frequency division multiple access (OFDMA), or any other suitable wireless technology, or any combination thereof.

An access terminal 110 is shown moving through the meshed wireless system by a series of broken lines. The access terminal 110 may be a mobile phone, a laptop computer, a personal digital assistant (PDA), a data transceiver, a pager, a camera, a game console, a modem, or any other suitable wireless device. The access terminal 110 may use the meshed wireless system to connect to the WAN 106. Once connected, data can be routed through the meshed wireless system from one access point to another until the data reaches its destination. In what follows, "downstream" means in the direction of the access terminal 110 and "upstream" means in the direction of the clusterhead 104a. Each access point in the data path stores data flowing downstream to the access terminal 110. Data is stored even after it has been forwarded, and data is stored even if the access point is not presently on the shortest path to the access terminal 110. In a manner to be described in greater detail later, the data stored by the access points may be used to facilitate the handoff of the access terminal 110 to another access point.

The access terminal 110 is shown initially in communication with the access point 104d. This access point 104d is referred to as a "serving" access point because it serves as a connection point to the meshed wireless system for the access terminal 110. In this configuration, the WAN 106 delivers higher layer packets, such as IP packets, destined for the access terminal 110 to the clusterhead 104a. The clusterhead 104a converts the higher layer packets into physical layer frames for routing through the meshed wireless system. The physical layer frames are routed to the access point 104b, referred to as an "intermediate access point." The intermediate access point 104b stores the physical layer frames before routing them to the serving access point 104d for delivery to the access terminal 110.

The access terminal 110 uses stamps added to, or in the physical layer frames to determine the playback sequence. The playback sequence is defined as the ordering of the higher layer packet stream sent to the application for processing. In the case where each physical layer frame contains a single higher layer packet, the stamp may be a sequence number added to the packet by a communications source, such as a TCP sequence number or a RTP playback timestamp. In the case where a higher layer packet is fragmented into multiple frames, or where multiple packets are consolidated into a single frame, the stamp is an additional field added to each frame by the clusterhead 104a.

The routing scenario just described above assumes that the physical layer frame format is the same throughout the meshed wireless system. However, as a practical matter, this may not always be the case. In at least one embodiment of the cluster 102, the physical layer frame format may change as the data travels down the meshed wireless system. In this embodiment, each access point 104b, 104d reframes the data before routing it downstream. The process of reframing data will be described in connection with FIGS. 2 and 3. In this case, the stamp used by the access terminal to determine the playback sequence is an additional field added to each frame by the serving access point 104d.

Figure 2:
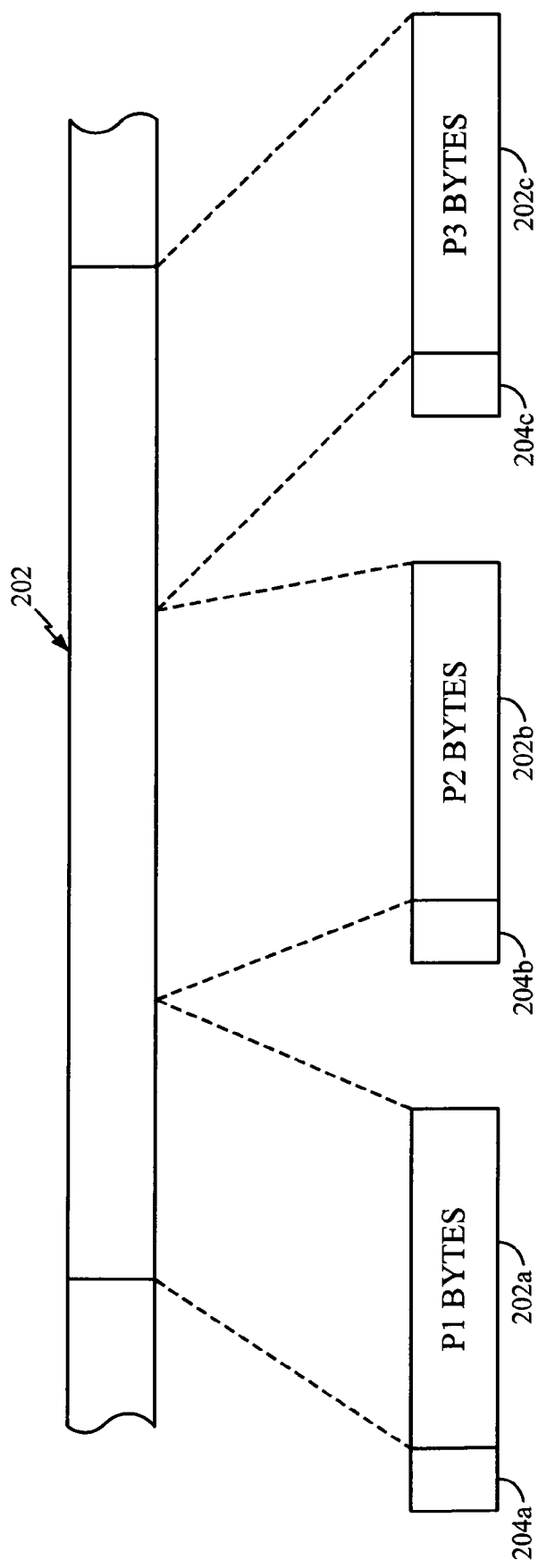
FIG. 2 is a diagram illustrating an example of a method for converting higher layer packets received by a clusterhead in a meshed wireless system into physical layer frames.

FIG. 2 is a diagram illustrating an example of a method for converting higher layer packets received by the clusterhead into physical layer frames. In this example, a higher layer packet 202 is fragmented into three physical layer frames 202a-202c by the clusterhead. The first frame 202a contains P1 bytes, the second frame 202b contains P2 bytes, and the third frame 202c contains P3 bytes. The clusterhead then adds a stamp 204a-204c, respectively, to each frame 202a-202c. The stamp is used downstream to reassemble the packet. The stamp may also be used for duplicate detection and frame reordering.

In one embodiment, the stamp may signify where the first byte in the frame is located within the packet stream. By way of example, the clusterhead may stamp the first frame 202a with n, indicating that the first byte in the first frame 202a is the $n^{th}$ byte in the packet stream. Since the first frame 202a has P1 bytes, the second frame will be stamped by the clusterhead with (n+P1), indicating that the first byte in the second frame 202b is the (n+P1) byte in the packet stream. Since the second frame 202b has P2 bytes, the third frame 202c will be stamped by the clusterhead with (n+P1+P2), indicating that the first byte in the third frame 202c is the (n+P1+P2) byte in the packet stream. Alternatively, the stamp can be a number that is incremented by one for each frame in the sequence. Those skilled in the art will readily understand that any suitable stamping technique may be used to implement the meshed wireless systems described throughout this disclosure. The packet stream identified by the stamp may be associated with one application or many, and there may be a stream identifier in the frame to allow many separate streams sent to an access terminal at once.

Figure 3:
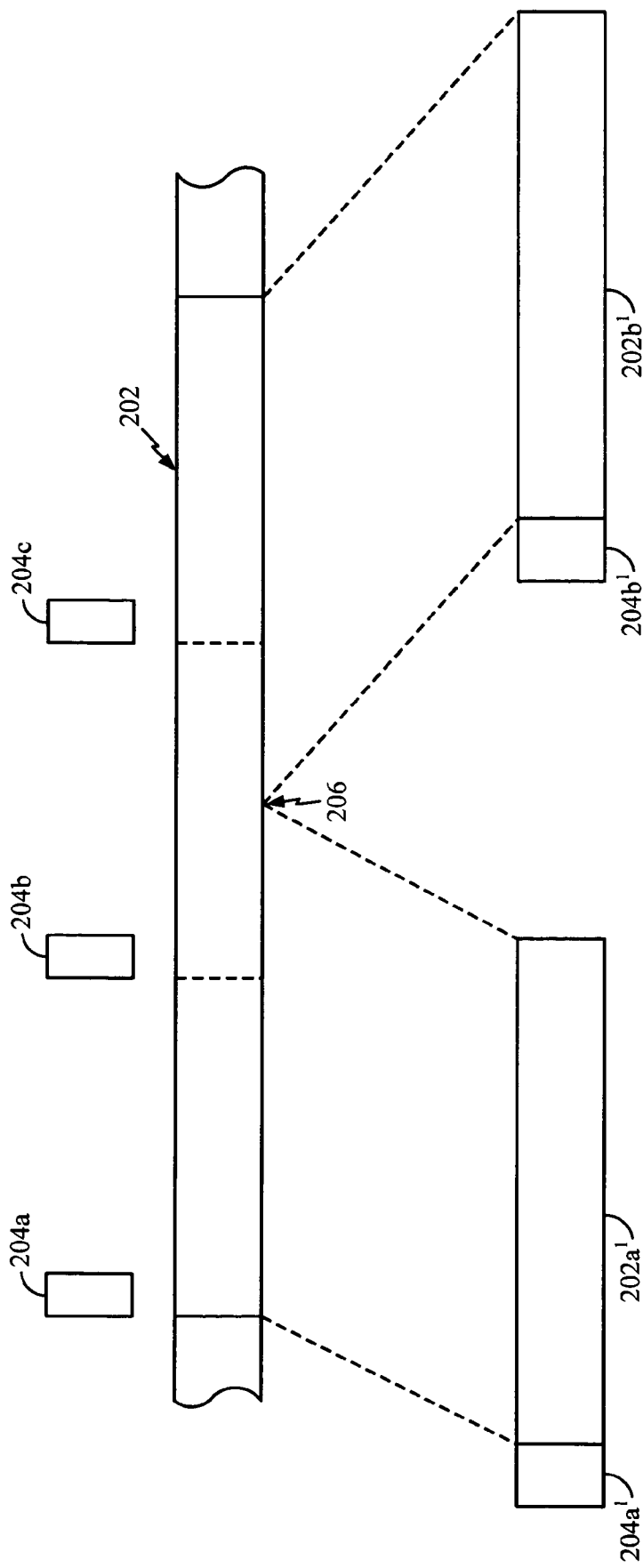
FIG. 3 is a diagram illustrating an example of a method for reframing data at an access point downstream from the clusterhead.

FIG. 3 is a diagram illustrating an example of a method for reframing data at an access point downstream from the clusterhead. In this example, the access point uses the stamps 204a-204c to reassemble the packet 202. Once reassembled, the access point frames a block of data 202a' from the reassembled packet 202, adds a stamp 204a' to the frame, and queues up the frame for routing downstream. The access point also maintains a pointer 206. In this example, the pointer 206 identifies the byte in the packet stream when the next frame begins. By way of example, before the data block 202a' is framed, the pointer 206 is set to x, indicating that the first byte in the data block is the $x^{th}$ byte in the packet stream. Using the pointer, the access point frames a data block having F1 bytes beginning with the $x^{th}$ byte in the packet stream. The pointer 206 is then set to (x+F1), indicating the first byte in the packet stream for the next frame to be created by the access point, where the next frame includes a data block 202b' and a stamp 204b'.

Returning to FIG. 1, the access terminal 110 is shown moving away from the serving access point 104d by a series of broken lines. As the access terminal 110 continues along this path, it will eventually be handed off to the access point 104e. This access point 104e is referred to as the "target" access point because it is the target of the handoff. As will be explained in greater detail shortly, the intermediate access point 104b facilitates the handoff by communicating to the target access point 104e the connection state between the serving access point 104d and the access terminal 110 when the handoff occurs. The "connection state" includes any information that an access point can use to determine the data in the meshed wireless system that remains to be delivered to an access terminal following handoff. By way of example, the connection state may be the pointer maintained by the serving access point 104d and/or the stamp of a frame. Alternatively, the connection state may be the actual data in the meshed wireless system that remains to be delivered to the access terminal 110 following handoff.

In one embodiment of the cluster 102, the handoff is initiated from the target access point 104e by sending a "data request" upstream to the first access point storing the data. In this example, the data request is sent by the target access point 104e to the intermediate access point 104b. The intermediate access point 104b sends an instruction to the serving access point 104d to cease any further delivery of frames to the access terminal 110, and send the pointer. The intermediate access point 104b uses the pointer to identify the data from storage that remains to be routed to the access terminal 110. This data is framed by the intermediate access point 104b and routed to the target access point 104e as the connection state. The data is reframed at the target access point 104e and delivered to the access terminal 110 following handoff.

Alternatively, the intermediate access point 104b can retrieve a stamp from the serving access point 104d if the physical layer frame format is the same throughout the cluster 102. In response to the data request from the target access point 104e, the intermediate access point 104b can retrieve either the stamp for the last frame delivered to the access terminal 110, the stamp for the next frame awaiting delivery to the access terminal 110, or any other stamp that allows the intermediate access point 104d to determine the first frame for delivery from the target access point 104e to the access terminal 110 following handoff. The intermediate access point 104b uses the stamp to route the appropriate frames from storage to the target access point 104e as the connection state. The frames are delivered by the target access point 104e to the access terminal 110 following handoff.

In another embodiment of the cluster 102, the target access point 104e overhears and stores the data routed from the clusterhead 104a to the serving access point 104d prior to handoff. In some embodiments of the cluster 102, the access terminal 110 maintains an active set of access points in its vicinity. All access points in the access terminal's active set listens on the backhaul for data delivered to the serving access point 104d. In this example, the target access point 104e can either hear the transmission from the intermediate access point 104b to the serving access point 104d, or the intermediate access point 104b intentionally sends the data to both the serving and target access points 104d, 104e, respectively.

In other embodiments of the cluster 102, the access point 104e listens on the backhaul for data delivered to the access terminal 110 by one or more access points 104a, 104b, 104d, and stores this data even if it is not in the active set of access terminal 110.)

When a handoff of the access terminal 110 from the serving access point 104d to the target access point 104e is initiated, the target access point 104e sends a "state request" upstream to the first access point storing the data, i.e., the intermediate access point 104b. The intermediate access point 104b sends an instruction to the serving access point 104d to cease any further delivery of frames to the access terminal 110, and send the pointer. The intermediate access point 104b forwards the pointer to the target access point 104e. The target access point 104e uses the pointer to identify the data in storage that remains to be delivered to the access terminal 110. This data is framed by the target access point 104e for delivery to the access terminal 110 following handoff.

If the same physical layer frame format is used throughout the cluster 102, the intermediate access point 104b may retrieve a stamp, rather than the pointer. The intermediate access point 104b forwards the stamp to the target access point 104e where it is used to pull from storage all frames that were not delivered by the serving access point 104d to the access terminal 110. These frames are delivered to the access terminal 110 by the target access point 104*e* following handoff.

Under certain conditions, the target access point 104*e* may be unable to store all the data destined for the access terminal 110. By way of example, the target access point 104*e* may be routing data downstream when the intermediate access point 104*b* is sending data to the serving access point 104*d*, or the target access point 104*e* may not be able to decode every frame because of various disturbances, such as noise and interference, in the radio path between the intermediate access point 104*b* and the target access point 104*e*. To deal with this situation, the target access point 104*e* may be configured to retrieve from the intermediate access point 104*b*, during handoff, the frames that it was unable to decode and still need to be sent to the access terminal 110. In this embodiment, the target access point 104*e* responds to a handoff by the access terminal 110 by sending both a data request and a state request to the intermediate access point 104*b*. The data request is limited to the frames that the target access point 104*e* was unable to decode. The intermediate access point 104*b* routes the requested frames to the target access point 104*e* so it can update its storage. At the same time, or thereabouts, the intermediate access point 104*b* sends an instruction to the serving access point 104*d* for the pointer or the stamp, and routes the same to the target access point 104*e*. Using the stamp or pointer, and the data in storage, the target access point 104*e* can pick up where the serving access point 104*d* left off following the handoff of the access terminal 110.

In one embodiment of the cluster 102, the target access point 104*e* may listen for and store the data routed between the serving access point 104*d* to the access terminal 110 prior to handoff. The data stored by the target access point 104*e* may be useful for a number reasons. By way of example, the target access point 104*e* may be unable to retrieve the stamp or the pointer from the serving access point 104*d* in response to a state request. In that case, the target access point 104*e* can use the stored data to identify the data that remains to be delivered to the access terminal 110 following handoff. Alternatively, or in addition to, this data can be used for retransmission following handoff for any frames that were delivered by the serving access point 104*d* to the access terminal, but were not successfully decoded.

Figure 4:
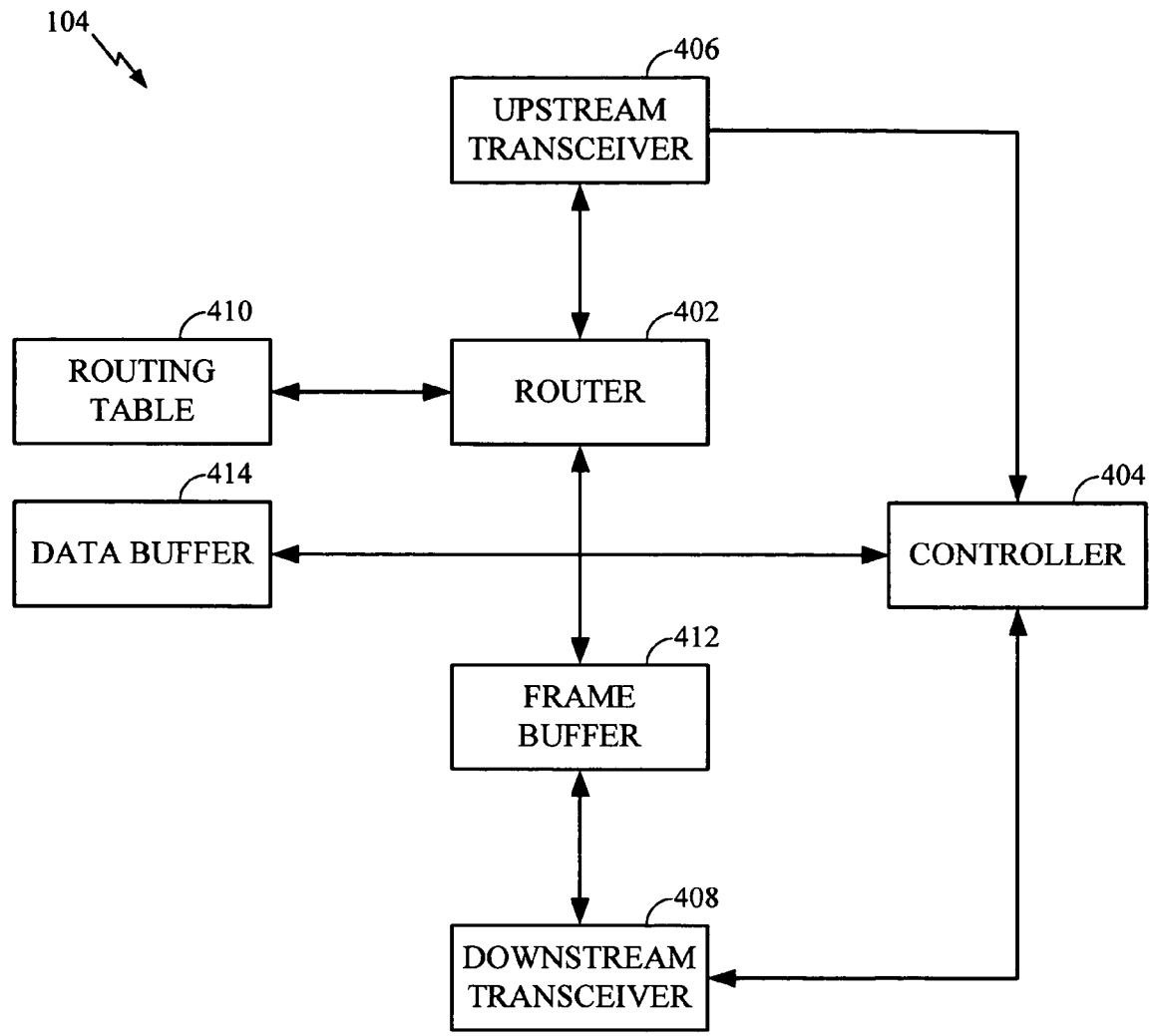
FIG. 4 is a functional block diagram illustrating an example of an access point.

FIG. 4 is a functional block diagram illustrating an example of an access point. The access point 104 may be a stand-alone entity or distributed across one or more entities within the cluster 102 (see FIG. 1). The access point 104 includes means for routing data received to an access terminal via a serving access point, depicted in FIG. 4 as a router 402. The access point 104 also includes means for communicating a connection state of the access terminal to a target access point during handoff, depicted in FIG. 4 as a controller 404.

The access point 104 includes an upstream transceiver 406 to support a radio link on the backhaul. A downstream transceiver 408 is used to support a radio link with downstream access points, as well as access terminals in its wireless coverage region. Although the transceivers 406, 408 are shown as separate entities, those skilled in the art will readily understand that the transceivers 406, 408 may be integrated together as single entity, or otherwise implemented in any suitable fashion.

In the downstream direction, the router 402 uses routing information contained in the packet stream to determine the destination access terminal in the meshed wireless system. Once the destination access terminal is identified, the router 402 consults a routing table 410 to determine the serving access point for the destination access terminal or next hop access point and the best path to route the frame. In the case where the cluster includes multiple clusterheads, the router 402 also uses routing information in the packet stream to determine the destination clusterhead and consults the routing table 410 for the best path to route the frames. The router 402 uses standard protocols to communicate with other routers in the meshed wireless system to dynamically reconfigure the data paths in the mesh network to best manage traffic.

A frame buffer 412 is used to reframe the data. As described in greater detail above, the frame buffer 412 reassembles the payload from the frames received by the upstream transceiver 406 and stores the payload in a data buffer 414. The frame buffer 412 also frames one or more blocks of data from the payload and attaches a stamp to each frame. For each frame routed by the frame buffer 412 through the downstream transceiver 408, the frame buffer 412 moves the pointer.

During handoff, the controller 404 is used to handle state and data requests from downstream access points. In response to a data request, the controller 404 uses the downstream transceiver 408 to retrieve the pointer or stamp from a serving access point. The controller 404 uses the stamp or pointer to release the data from the data buffer 414 to the frame buffer 412. The controller 404 also prompts the router 402 to update the routing table 410 to accommodate the handoff of the access terminal to the target access point. The frame buffer 412 frames the data from the data buffer 414 and adds a stamp to each frame.

In response to a state request, the controller 404 also retrieves the pointer or stamp from a serving access point. However, in the case of a state request, the controller 404 simply forwards the pointer or stamp to the target access point through the downstream transceiver 408.

The controller 404 may also be used to facilitate handoff when the access point 104 is either a serving or target access point. In the case of a serving access point, the controller 404 communicates with the frame buffer 412 to disable the further framing of data and retrieve the pointer. The pointer retrieved from the frame buffer 412 is routed by the controller 404 to an intermediate access point through the upstream transceiver 406.

In the case of a target access point, the controller 404 initiates handoff by either sending a data request or a state request to an intermediate access point. In response to a data request, the access point 104 will receive data from the intermediate access point via the upstream transceiver 406, retrieve routing information via the router 402 and routing table 410, reframe the data in the frame buffer 412, and deliver the frames to the access terminal through the downstream transceiver 408.

Alternatively, as described in greater detail above, the access point 104 may listen on the backhaul for data transmitted from the intermediate access point to the serving access point prior to handoff. In this embodiment, the access point includes a means for detecting the data on the backhaul, depicted in FIG. 4 as the upstream transceiver 406, and means for storing the data, depicted in FIG. 4 as the data buffer 414. The controller 404 also provides means for receiving the handoff of the access terminal and means for routing data in the data buffer 414 to the access terminal.

In this alternate embodiment, the controller 404 initiates handoff by sending a state request through the upstream transceiver 406 to the intermediate access point. In response to the state request, the controller 404 will receive a pointer or stamp from the intermediate access point via the upstream transceiver 406. The pointer of stamp is used by the controller 404 to release data from the data buffer 414 to the frame buffer 412. The frame buffer 412 frames the data, and the downstream transceiver 408 delivers the frames to the access terminal following handoff.

Figure 5:
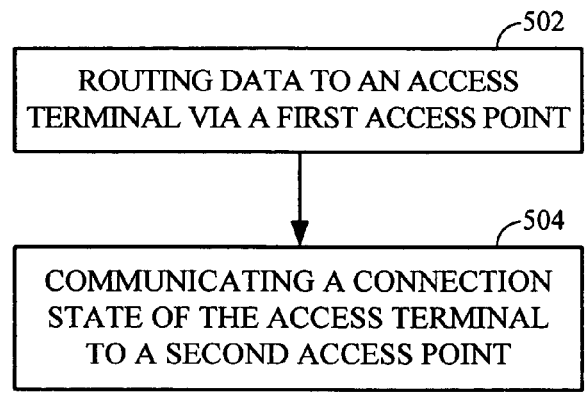
FIG. 5 is a flow chart illustrating an example of a method of handing off an access terminal.

FIG. 5 is a flow chart illustrating an example of a method of handing off an access terminal. In step 502, the data is routed to an access terminal via a first access point. In step 504, a connection state of the access terminal is communicated to a second access point if a handoff of the access terminal from the first access point to the second access point is requested.

Figure 6:
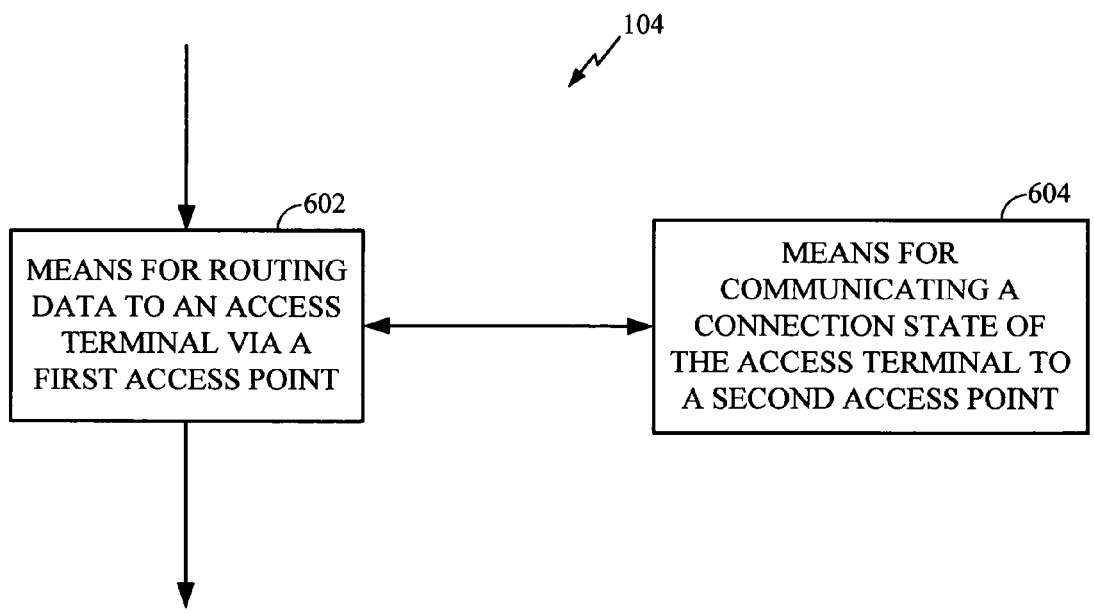
FIG. 6 is a functional block diagram illustrating an example of an access point.

FIG. 6 is a functional block diagram illustrating an example of an access point. The access point 104 includes means for routing data to an access terminal via a first access point 602. The routing means 604 may be a router. The access point also includes means for communicating a connection state of the access terminal to a second access point if a handoff of the access terminal from the first access point to the second access point is requested 604. The communicating means 604 may be a controller.

Figure 7:
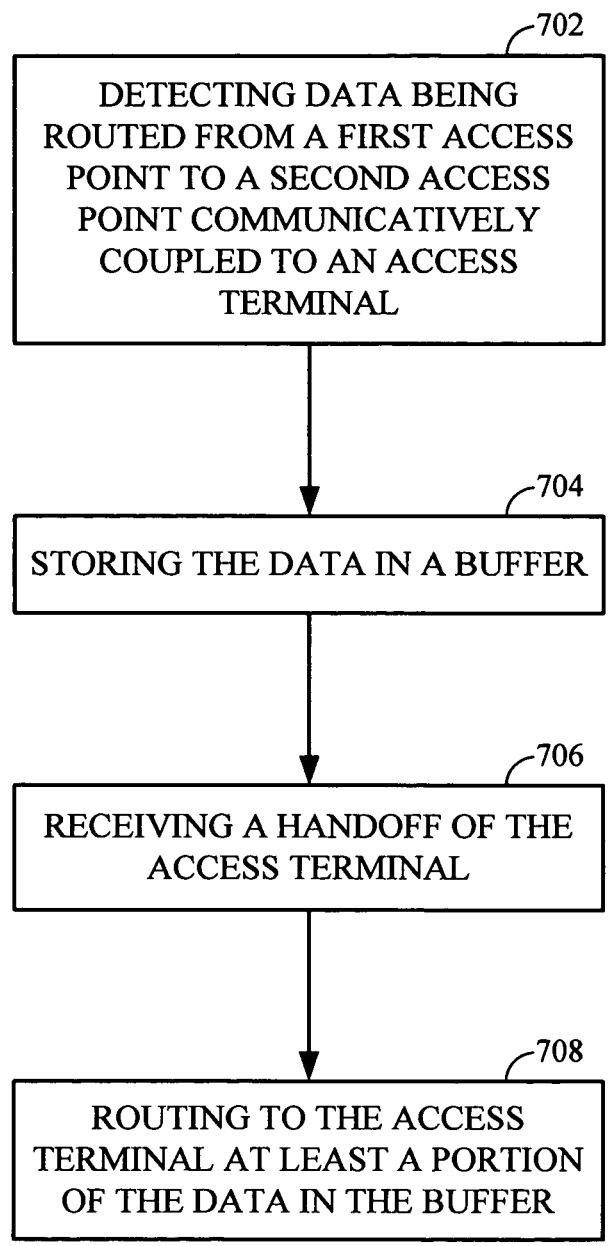
FIG. 7 is a flow chart illustrating an example of a method of handing off an access terminal.

FIG. 7 is a flow chart illustrating an example of a method of handing off an access terminal. In step 702, data being routed from a first access point to a second access point is detected while the second access point is communicatively coupled to an access terminal. In step 704, the data is stored in a buffer. In step 706, the access terminal is handed off to the access point. In step 708, at least a portion of the data in the buffer is routed to the access terminal.

Figure 8:
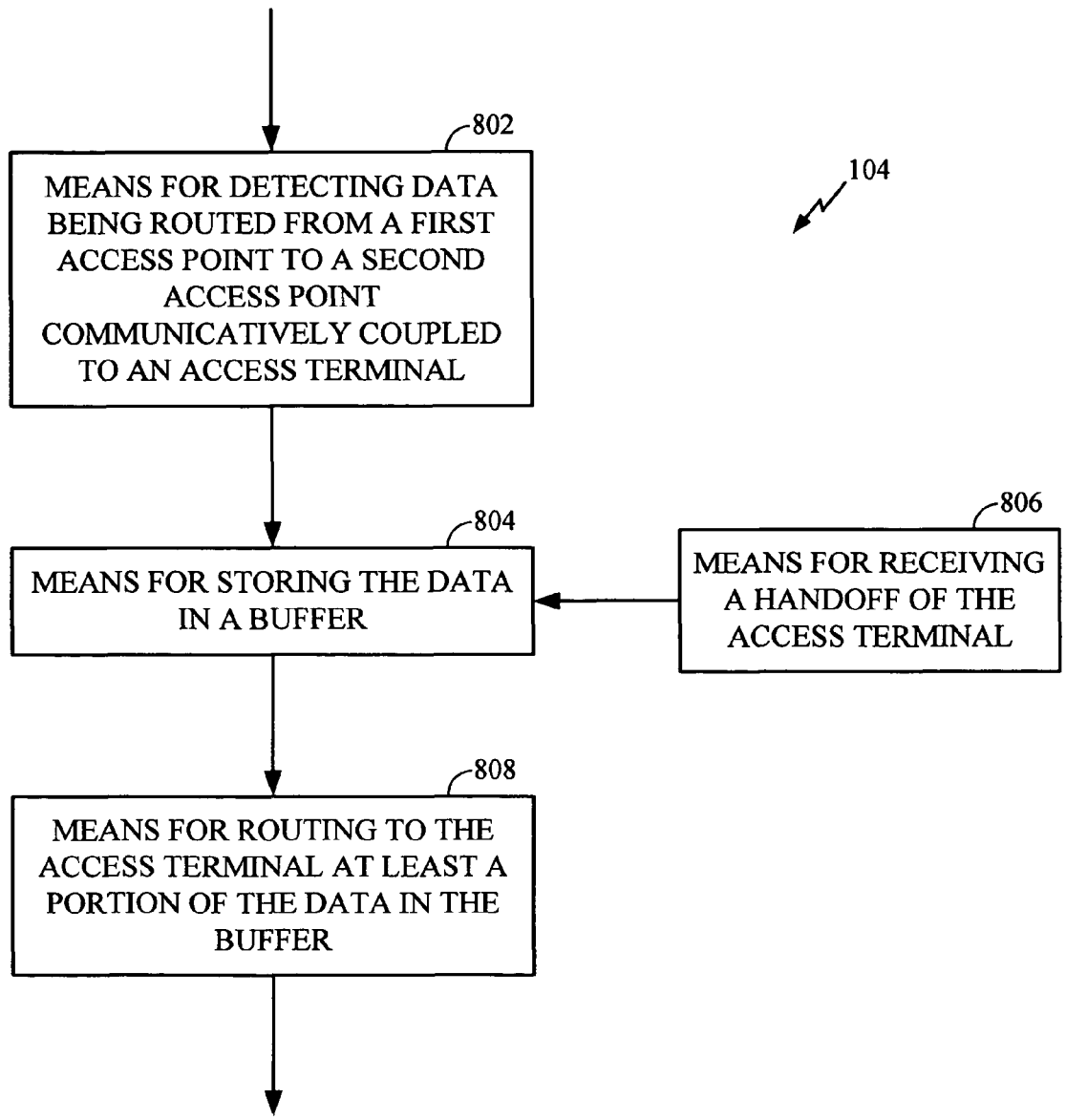
FIG. 8 is a functional block diagram illustrating an example of an access point.

FIG. 8 is a functional block diagram illustrating an example of an access point. The access point 104 includes means for detecting data being routed from a first access point to a second access point communicatively coupled to an access terminal 802. The detecting means 802 may be a transceiver. The access point 104 also includes means for storing the data 804. The storing means 804 may be a buffer. The access point 104 also includes means for receiving a handoff of the access terminal 806. The receiving means 806 may be a controller. The access point 104 further includes means for routing to the access terminal at least a portion of the data in the buffer 808. The routing 808 means may be a router.

The various illustrative functional blocks, modules, circuits, elements, and/or components described in connection with the embodiments disclosed herein may be implemented as individual or shared hardware components, as software applications running on one or more hardware components, including by way of example, a microprocessor or other processor that supports software, a digital signal processor (DSP) with embedded software, an application specific integrated circuit (ASIC), a controller, microcontroller, or state machine, field programmable gate array (FPGA) or other programmable logic component, discrete gate or transistor logic, discrete hardware components, or any combination thereof designed to perform the functions described herein. The software resides in computer readable medium coupled to the processor or integral to the processor. The computer readable medium may include one or more storage devices, including by way of example, RAM memory, flash memory, ROM memory, EPROM memory, EEPROM memory, registers, hard disk, a removable disk, a CD-ROM, or any other form of storage medium known in the art. Computer readable medium may also include a carrier wave that encodes a data signal. Those skilled in the art will recognize the interchangeability of hardware, firmware, and software configurations under these circumstances, and how best to implement the described functionality for each particular application.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An access point, comprising:
a transceiver;
a router configured to route data to an access terminal via a second access point; and
a controller configured to communicate a connection state of the access terminal to a third access point using the transceiver, if a handoff of the access terminal from the second access point to the third access point is requested, and configured to send to the second access point, when a pointer is sent, an instruction to cease any further delivery of frames to the access terminal,
wherein the connection state identities data stored at the third access point prior to the handoff that the access terminal did not receive from the second access point and prior to communication of the connection state to the third access point, and the connection state includes the pointer indicating fragmented data that remains to be delivered to the access terminal.

2. The access point of claim 1, wherein the controller is further configured to receive a handoff request from an access terminal not currently receiving data being routed by the router, and route the handoff request to the third access point.

3. The access point of claim 1, wherein the controller is further configured to store the data in a buffer, and communicate the connection state by providing to the third access point at least a portion of the data in the buffer that the access terminal did not receive from the second access point.

4. The access point of claim 3, wherein the controller is further configured to query the second access point to identify which of the data in the buffer should be provided to the third access point.

5. The access point of claim 3, wherein the data is framed, each of the frames being associated with a stamp, and wherein the controller is further configured to query the second access point for one of the stamps, and use said one of the stamps to identify the frames in the buffer containing the data to be provided to the third access point.

6. The access point of claim 3, wherein the controller is further configured to query the second access point for a pointer associated with the data that was being routed by the second access point to the access terminal, and use the pointer to identify which of the data in the buffer should be provided to the third access point.

7. The access point of claim 5, wherein the data is divided into frames and each of the frames received is stamped, and wherein the controller is further configured to query the second access point for one of the stamps, and communicate the connection state of the access terminal by providing said one of the stamps to the third access point.

8. The access point of claim 1, wherein the controller is further configured to query the first access point for a pointer associated with the data that was being routed by the second access point to the access terminal, and communicate the connection state of the access terminal by providing the pointer to the third access point.

9. The access point of claim 1, wherein the router is further configured to route data over a radio link to the third access point.

10. An access point, comprising:
a transceiver configured to detect data being routed from a second access point to a third access point communicatively coupled to an access terminal, wherein the transceiver detects the data by overhearing wireless transmission of the data from the second access point to the third access point;
a buffer configured to store the data; and
a controller configured to receive a handoff of the access terminal configured to receive a connection state between the second access point and the third access point, configured to transmit to the access terminal, using the transceiver, at least a portion of the data in the buffer, based on a pointer indicating fragmented data that remains to be delivered to the access terminal, and configured to send to the third access point, when the pointer is sent, an instruction to cease any further delivery of frames to the access terminal, wherein the connection state includes the pointer.

11. The access point of claim 10, wherein the data transmitted to the access terminal is data that the access terminal did not receive from the third access point.

12. The access point of claim 11, wherein the data is framed, each of the frames being associated with a stamp, and wherein the controller is further configured to retrieve from the second access point one of the stamps, and use said one of the stamps to determine the data in the buffer to transmit to the access terminal.

13. The access point of claim 11, wherein the controller is further configured to retrieve from the second access point a pointer associated with the data that was being routed by the third access point to the access terminal, and use the pointer to determine the data in the buffer to transmit to the access terminal.

14. The access point of claim 10, wherein the controller is further configured to retrieve, during the process of receiving the handoff, data routed from the second access point to the third access point that was not detected.

15. A method of handing off an access terminal, comprising:
routing data to an access terminal via a first access point;
communicating a connection state of the access terminal to a second access point if a handoff of the access terminal from the first access point to the second access point is requested, wherein the connection state identifies data stored at the second access point prior to the handoff that the access terminal did not receive from the first access point and prior to communication of the connection state to the second access point, and the connection state includes a pointer indicating fragmented data that remains to be delivered to the access terminal; and
sending to the first access point, when the pointer is sent, an instruction to cease any further delivery of frames to the access terminal.

16. The method of claim 15, wherein the data is routed to the access terminal by a processor, the method further comprising receiving a handoff request from an access terminal not currently receiving data being routed by the processor, and routing the handoff request to a third access point.

17. The method of claim 15, further comprising storing the data in a buffer, and communicating the connection state by providing to the second access point at least a portion of the data in the buffer that the access terminal did not receive from the first access point.

18. The method of claim 17, further comprising querying the first access point to identify which of the data in the buffer should be provided to the second access point.

19. The method of claim 17, wherein the data is framed, each of the frames being associated with a stamp, the method further comprising querying the first access point for one of the stamps, and using said one of the stamps to identify the frames in the buffer containing the data to be provided to the second access point.

20. The method of claim 17, further comprising querying the first access point for a pointer associated with the data that was being routed by the first access point to the access terminal; and using the pointer to identify which of the data in the buffer should be provided to the second access point.

21. The method of claim 19, wherein the data is divided into frames and each of the frames received is stamped, the method further comprising querying the first access point for one of the stamps, and communicating the connection state of the access terminal by providing said one of the stamps to the second access point.

22. The method of claim 15, further comprising querying the first access point for to a pointer associated with the data that was being routed by the first access point to the access terminal, and communicating the connection state of the access terminal by providing the pointer to the second access point.

23. The method of claim 15, further comprising transmitting data over a radio link to a second access terminal.

24. A method of handing off an access terminal, comprising:
detecting, at a first access point, data being routed from a second access point to a third access point communicatively coupled to an access terminal, wherein the detecting the data comprises overhearing wireless transmission of the data from the second access point to the third access point;
storing the data in a buffer;
receiving a handoff of the access terminal to the first access point and a connection state between the second access point and the third access point, wherein the connection state includes a pointer indicating fragmented data that remains to be delivered to the access terminal;
sending to the third access point, when the pointer is sent, an instruction to cease any further delivery of frames to the access terminal; and
routing to the access terminal at least a portion of the data in the buffer, based on the pointer.

25. The method of claim 24, wherein the data routed to the access terminal is data that the access terminal did not receive from the third access point.

26. The method of claim 25, wherein the data is framed, each of the frames being associated with a stamp, the method further comprising retrieving from the second access point one of the stamps, and using said one of the stamps to determine the data in the buffer to route to the access terminal.

27. The method of claim 25, further comprising retrieving from the second access point a pointer associated with the data that was being routed by the third access point to the access terminal, and using the pointer to determine the data in the buffer to route to the access terminal.

28. The method of claim 24, further comprising retrieving, during the process of receiving the handoff, data routed from the second access point to the third access point that was not detected.

29. An apparatus, comprising:
means for routing data to an access terminal via a first access point;
means for communicating a connection state of the access terminal to a second access point if a handoff of the access terminal from the first access point to the second access point is requested, wherein the connection state identifies data stored at the second access point prior to the handoff that the access terminal did not receive from the first access point and prior to communication of the connection state to the second access point, and the connection state includes a pointer indicating fragmented data that remains to be delivered to the access terminal; and
means for sending to the first access point, when the pointer is sent, an instruction to cease any further delivery of frames to the access terminal.

30. The apparatus of claim 29, further comprising means for receiving a handoff request from an access terminal not currently receiving data being routed by the routing means, and means for routing the handoff request to a third access point.

31. The apparatus of claim 29, further comprising means for storing the data, and
wherein the means for communicating the connection state of the access terminal comprises means for providing to the second access point at least a portion of the data in the buffer that the access terminal did not receive from the first access point.

32. The apparatus of claim 30, further comprising means for querying the first access point to identify which of the data in the buffer should be provided to the second access point.

33. The apparatus of claim 30, wherein the data is framed, each of the frames being associated with a stamp, the apparatus further comprising means for querying the first access point for one of the stamps, and means for using said one of the stamps to identify the frames in the buffer containing the data to be provided to the second access point.

34. The apparatus of claim 30, further comprising means for querying the first access point for a pointer associated with the data that was being routed by the first access point to the access terminal; and means for using the pointer to identify which of the data in the buffer should be provided to the second access point.

35. The apparatus of claim 33, wherein the data is divided into frames and each of the frames received is stamped, the apparatus further comprising means for querying the first access point for one of the stamps, and means for communicating the connection state of the access terminal by providing said one of the stamps to the second access point.

36. The apparatus of claim 29, further comprising means for querying the first access point for to a pointer associated with the data that was being routed by the first access point to the access terminal, and means for communicating the connection state of the access terminal by providing the pointer to the second access point.

37. The apparatus of claim 29, further comprising means for transmitting data over a radio link to a second access terminal.

38. An apparatus, comprising:
means for detecting, at a first access point, data being routed from a second access point to a third access point communicatively coupled to an access terminal, wherein the means for detecting detects the data by overhearing wireless transmission of the data from the second access point to the third access point;
means for storing the data in a buffer;
means for receiving a handoff of the access terminal to the first access point and a connection state between the second access point and the third access point, wherein the connection state includes a pointer indicating fragmented data that remains to be delivered to the access terminal;
means for sending to the third access point, when the pointer is sent, an instruction to cease any further delivery of frames to the access terminal; and
means for routing to the access terminal at least a portion of the data in the buffer, based on the pointer.

39. The apparatus of claim 38, wherein the data routed to the access terminal is data that the access terminal did not receive from the third access point.

40. The apparatus of claim 39, wherein the data is framed, each of the frames being associated with a stamp, the apparatus further comprising means for retrieving from the second access point one of the stamps, and means for using said one of the stamps to determine the data in the buffer to route to the access terminal.

41. The apparatus of claim 39, further comprising means for retrieving from the second access point a pointer associated with the data that was being routed by the third access point to the access terminal, and means for using the pointer to determine the data in the buffer to route to the access terminal.

42. The apparatus of claim 38, further comprising means for retrieving, during the process of receiving the handoff, data routed from the second access point to the third access point that was not detected.

43. A non-transitory computer readable medium embodying a computer program which when executed operates to hand off an access terminal, the computer program comprising:
instructions to route data to an access terminal via a first access point;
instructions to communicate a connection state of the access terminal to a second access point if a handoff of the access terminal from the first access point to the second access point is requested, wherein the connection state identifies data stored at the second access point prior to the handoff that the access terminal did not receive from the first access point and prior to communication of the connection state to the second access point, and the connection state includes a pointer indicating fragmented data that remains to be delivered to the access terminal; and
instructions to send to the first access point, when the pointer is sent, an instruction to cease any further delivery of frames to the access terminal.

44. The computer readable medium of claim 43, wherein the method further comprises receiving a handoff request from an access terminal not currently receiving data being routed via execution of the instructions, and routing the handoff request to a third access point.

45. The computer readable medium of claim 43, wherein the computer program further comprises instructions to store the data in a buffer, and instructions to communicate the connection state by providing to the second access point at least a portion of the data in the buffer that the access terminal did not receive from the first access point.

46. The computer readable medium of claim 45, wherein the computer program further comprises instructions to query the first access point to identify which of the data in the buffer should be provided to the second access point.

47. The computer readable medium of claim 45, wherein the data is framed, each of the frames being associated with a stamp, and wherein the computer program further comprises instructions to query the first access point for one of the stamps, and instructions to use said one of the stamps to identify the frames in the buffer containing the data to be provided to the second access point.

48. The computer readable medium of claim 45, wherein the computer program further comprises instructions to query the first access point for a pointer associated with the data that was being routed by the first access point to the access terminal; and instructions to use the pointer to identify which of the data in the buffer should be provided to the second access point.

49. The computer readable medium of claim 47 wherein the each of the frames received is stamped, the computer program further comprising instructions to query the first access point for one of the stamps, and instructions to communicate the connection state of the access terminal by providing said one of the stamps to the second access point.

50. The computer readable medium of claim 43, wherein the computer program further comprises instructions to query the first access point for to a pointer associated with the data that was being routed by the first access point to the access terminal, and instructions to communicate the connection state of the access terminal by providing the pointer to the second access point.

51. The computer readable medium of claim 43, wherein the computer program further comprises instructions to transmit data over a radio link to a second access terminal.

52. A non-transitory computer readable medium embodying a computer program which when executed operates to hand off an access terminal, the computer program comprising:
    instructions to detect, at a first access point, data being routed from a second access point to a third access point communicatively coupled to an access terminal, wherein the instructions to detect comprise instructions to overhear wireless transmission of the data from the second access point to the third access point;
    instructions to store the data in a buffer;
    instructions to receive a handoff of the access terminal to the first access point and a connection state between the second access point and the third access point, wherein the connection state includes a pointer indicating fragmented data that remains to be delivered to the access terminal;
    instructions to send to the third access point, when the pointer is sent, an instruction to cease any further delivery of frames to the access terminal; and
    instructions to route to the access terminal at least a portion of the data in the buffer, based on the pointer indication.

53. The computer readable medium of claim 52, wherein the data routed to the access terminal is data that the access terminal did not receive from the third access point.

54. The computer readable medium of claim 53, wherein the data is framed, each of the frames being associated with a stamp, and wherein the computer program further comprises instructions to retrieve from the first access point one of the stamps, and instructions to use said one of the stamps to determine the data in the buffer to route to the access terminal.

55. The computer readable medium of claim 53, wherein the computer program further comprises instructions to retrieve from the first access point a pointer associated with the data that was being routed by the second access point to the access terminal, and instructions to use the pointer to determine the data in the buffer to route to the access terminal.

56. The computer readable medium of claim 52, wherein the computer program further comprises instructions to retrieve, during the process of receiving the handoff, data routed from the first access point to the second access point that was not detected.

57. An apparatus, comprising:
    a router configured to route data to an access terminal via a first access point; and
    a controller configured to communicate a connection state of the access terminal to a second access point if a handoff of the access terminal from the first access point to the second access point is requested, and to send to the first access point, when a pointer is sent, an instruction to cease any further delivery of frames to the access terminal, wherein the connection state identifies data stored at the second access point prior to the handoff that the access terminal did not receive from the first access point and prior to communication of the connection state to the second access point, and the connection state includes the pointer indicating fragmented data that remains to be delivered to the access terminal.

58. The apparatus of claim 57, wherein the controller is further configured to receive a handoff request from an access terminal not currently receiving data being routed by the router, and route the handoff request to a third access point.

59. The apparatus of claim 57, further comprising a buffer configured to store the data, and wherein the controller is further configured to communicate the connection state by providing to the second access point at least a portion of the data in the buffer that the access terminal did not receive from the first access point.

60. The apparatus of claim 59, wherein the controller is further configured to query the first access point to identify which of the data in the buffer should be provided to the second access point.

61. The apparatus of claim 59, wherein the data is framed, each of the frames being associated with a stamp, and wherein the controller is further configured to query the first access point for one of the stamps, and use said one of the stamps to identify the frames in the buffer containing the data to be provided to the second access point.

62. The apparatus of claim 59, wherein the controller is further configured to query the first access point for a pointer associated with the data that was being routed by the first access point to the access terminal; and use the pointer to identify which of the data in the buffer should be provided to the second access point.

63. The apparatus of claim 57, wherein the data is divided into frames and each of the frames received is stamped, and wherein the controller is further configured to query the first access point for one of the stamps, and communicate the connection state of the access terminal by providing said one of the stamps to the second access point.

64. The apparatus of claim 61, wherein the controller is further configured to query the first access point for to a pointer associated with the data that was being routed by the first access point to the access terminal, and communicate the connection state of the access terminal by providing the pointer to the second access point.

65. The apparatus of claim 57, wherein the router is further configured to route data over a radio link to a second access terminal.

66. An apparatus, comprising:
- a transceiver configured to detect, at a first access point, data being routed from a second access point to a third access point communicatively coupled to an access terminal, wherein the transceiver detects the data by overhearing wireless transmission of the data from the second access point to the third access point;
- a buffer configured to store the data; and
- a controller configured to receive a handoff of the access terminal to the first access point and a connection state between the second access point and the third access point, configured to send to the third access point, when a pointer is sent, an instruction to cease any further delivery of frames to the access terminal, and configured to route to the access terminal at least a portion of the data in the buffer, based on the pointer,
- wherein the connection state includes the pointer indicating fragmented data that remains to be delivered to the access terminal.

67. The apparatus of claim 66, wherein the data routed to the access terminal is data that the access terminal did not receive from the third access point.

68. The apparatus of claim 67, wherein the data is framed, each of the frames being associated with a stamp, and wherein the controller is further configured to retrieve from the second access point one of the stamps, and use said one of the stamps to determine the data in the buffer to route to the access terminal.

69. The apparatus of claim 67, wherein the controller is further configured to retrieve from the second access point a pointer associated with the data that was being routed by the third access point to the access terminal, and use the pointer to determine the data in the buffer to route to the access terminal.

70. The apparatus of claim 66, wherein the controller is further configured to retrieve, during the process of receiving the handoff, data routed from the second access point to the third access point that was not detected.

* * * * *